United States Patent
Koeppl et al.

(10) Patent No.: US 10,900,453 B2
(45) Date of Patent: Jan. 26, 2021

(54) METHOD FOR STARTING AN INTERNAL COMBUSTION ENGINE FOR A MOTOR VEHICLE, AND DRIVE TRAIN FOR A MOTOR VEHICLE

(71) Applicant: Bayerische Motoren Werke Aktiengesellschaft, Munich (DE)

(72) Inventors: Roland Koeppl, Dachau (DE); Sherif Mahmoud, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/713,161

(22) Filed: Dec. 13, 2019

(65) Prior Publication Data
US 2020/0116114 A1    Apr. 16, 2020

Related U.S. Application Data

(63) Continuation of application No. PCT/EP2018/071216, filed on Aug. 6, 2018.

(30) Foreign Application Priority Data

Aug. 11, 2017 (DE) .................. 10 2017 214 041

(51) Int. Cl.
*F02N 1/00* (2006.01)
*F02N 11/00* (2006.01)
(Continued)

(52) U.S. Cl.
CPC ............ *F02N 11/006* (2013.01); *B60K 17/22* (2013.01); *F02N 11/0814* (2013.01);
(Continued)

(58) Field of Classification Search
CPC ........ F02N 11/00; F02N 11/003; F02N 15/00; F02N 15/02; F02N 15/06
(Continued)

(56) References Cited

U.S. PATENT DOCUMENTS 6,240,890 B1   6/2001   Abthoff et al.
2012/0006152 A1*  1/2012  Fuechtner .............. B60K 6/442
                                                          74/640
(Continued)

FOREIGN PATENT DOCUMENTS

DE          198 52 085 C1     2/2000
DE   10 2010 030 398 A1      12/2011
(Continued)

OTHER PUBLICATIONS

International Search Report (PCT/ISA/210) issued in PCT Application No. PCT/EP2018/071216 dated Nov. 15, 2018 with English translation (five (5) pages).
(Continued)

*Primary Examiner* — John Kwon
(74) *Attorney, Agent, or Firm* — Crowell & Moring LLP

(57) ABSTRACT

A method is provided for starting an internal combustion engine with a driveshaft for a motor vehicle. A starting process is carried out, by which the internal combustion engine is started and thereby transferred from a deactivated state into a powered operation, wherein the starting process is carried out by a pinion starter and by a belt starter, by which the driveshaft is driven during the starting process.

8 Claims, 1 Drawing Sheet

(51) Int. Cl.
  *B60K 17/22* (2006.01)
  *F02N 11/08* (2006.01)
  *F02N 15/04* (2006.01)
  *F02N 15/08* (2006.01)

(52) U.S. Cl.
  CPC .......... *F02N 11/0859* (2013.01); *F02N 15/04* (2013.01); *F02N 15/08* (2013.01)

(58) Field of Classification Search
  USPC .... 123/179.1, 179.22, 179.28, 179.25, 184.1
  See application file for complete search history.

(56) References Cited

U.S. PATENT DOCUMENTS

| | | |
|---|---|---|
| 2016/0185230 A1 | 6/2016 | Reichow et al. |
| 2019/0077405 A1* | 3/2019 | Millon .................... F02N 15/08 |
| 2020/0153028 A1* | 5/2020 | Winger ................. B60W 20/10 |
| 2020/0153051 A1* | 5/2020 | Winger .................. B60L 50/66 |

FOREIGN PATENT DOCUMENTS

| | | |
|---|---|---|
| DE | 10 2010 036 321 A1 | 1/2012 |
| DE | 10 2013 001 093 A1 | 7/2014 |
| DE | 10 2015 012 244 A1 | 3/2016 |
| DE | 10 2015 215 550 A1 | 2/2017 |
| DE | 10 2016 005 124 A1 | 4/2017 |
| EP | 3 022 568 B1 | 3/2017 |
| FR | 2 839 119 A1 | 10/2003 |
| FR | 2 969 220 A1 | 6/2012 |
| FR | 3 034 471 A2 | 10/2016 |

OTHER PUBLICATIONS

German-language Written Opinion (PCT/ISA/237) issued in PCT Application No. PCT/EP2018/071216 dated Nov. 15, 2018 (five (5) pages).

German-language Search Report issued in counterpart German Application No. 102017214041.0 dated Mar. 15, 2018 with partial English translation (10 pages).

\* cited by examiner

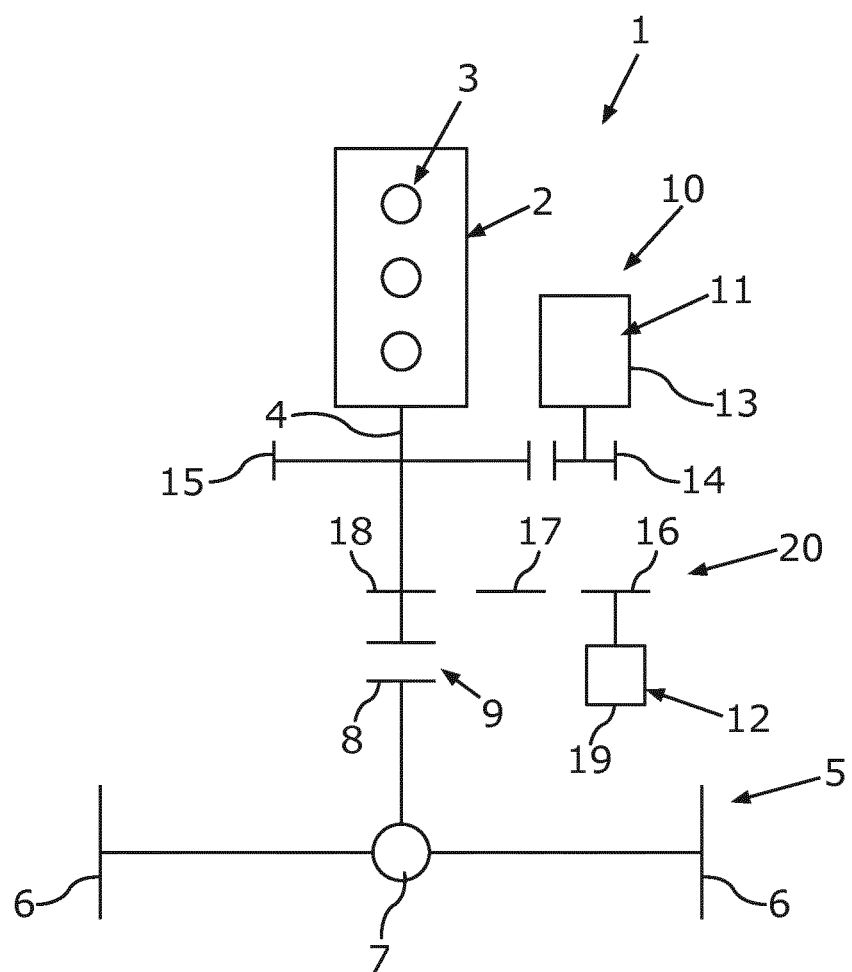

METHOD FOR STARTING AN INTERNAL COMBUSTION ENGINE FOR A MOTOR VEHICLE, AND DRIVE TRAIN FOR A MOTOR VEHICLE

CROSS REFERENCE TO RELATED APPLICATIONS

This application is a continuation of PCT International Application No. PCT/EP2018/071216, filed Aug. 6, 2018, which claims priority under 35 U.S.C. § 119 from German Patent Application No. 10 2017 214 041.0, filed Aug. 11, 2017, the entire disclosures of which are herein expressly incorporated by reference.

BACKGROUND AND SUMMARY OF THE INVENTION

The invention relates to a method for starting an internal combustion engine for a motor vehicle. The invention furthermore relates to a drivetrain for a motor vehicle.

Methods for starting internal combustion engines for motor vehicles and drivetrains for motor vehicles are already well-known from the general prior art. Here, the respective internal combustion engine has a driveshaft which is formed for example as a crankshaft and via which the internal combustion engine can for example provide torque for driving the respective motor vehicle. Here, the respective drivetrain includes the internal combustion engine and a starting device, by means of which a starting process can be performed or is performed. By means of the starting process, the internal combustion engine is started and is thus transferred from a deactivated state into powered operation.

DE 10 2015 012 244 A1 discloses a starting device for starting a motor vehicle, having a start-stop button for starting the motor vehicle.

DE 10 2010 036 321 A1 discloses a drive system for a motor vehicle, having a transmission for driving at least one drive axle of the motor vehicle and having an internal combustion engine which is selectively operatively connected to or decoupled from the transmission.

Furthermore, EP 3 022 568 B1 discloses an on-board electrical system for a vehicle.

It is an object of the present invention to create a method and a drivetrain of the type mentioned in the introduction, such that a particularly advantageous start of the internal combustion engine can be realized in a comfortable manner.

A first aspect of the invention relates to a method for starting an internal combustion engine for a motor vehicle, in particular for a motor car such as for example a passenger automobile. Here, the internal combustion engine has a driveshaft via which the internal combustion engine can, for example, provide torques for driving the motor vehicle. The driveshaft is, for example, in the form of a crankshaft, wherein the internal combustion engine may be designed in particular as a reciprocating-piston engine. In the method, a starting process is performed by which the internal combustion engine is started and is thereby transferred from a deactivated state into powered operation.

To now be able to realize a particularly advantageous and in particular comfortable start of the internal combustion engine in a manner which is expedient in terms of structural space and weight, provision is made according to the invention whereby the starting process is performed by way of a pinion starter and by way of a belt starter, by which the driveshaft is driven during the starting process. The pinion starter is for example a first starter or is also referred to as first starter, wherein the belt starter for example is a second starter or is also referred to as second starter. For example, the starters are constituent parts of a starting device by which the starting process can be performed in order to start the internal combustion engine. In the deactivated state of the internal combustion engine, the latter is deactivated or shut down, such that no combustion processes take place in the internal combustion engine, in particular in respective combustion chambers, formed for example as cylinders, of the internal combustion engine. In the course of or during the starting process, the driveshaft is driven by the starting device, that is to say by means of the pinion starter and by means of the belt starter, in particular until such time as combustion processes take place in the internal combustion engine, by which combustion processes the driveshaft is then driven, in particular without the aid of the starters. By virtue of the fact that both starters are utilized for driving the driveshaft and thus for starting the internal combustion engine during the starting process, it is possible to prevent excessive vibrations from arising during the starting process, which are for example perceptible to occupants of the motor vehicle, such that the starting process can be performed in a particularly comfortable manner. Furthermore, the two starters can be of a compact design which is expedient in terms of weight and costs, such that the costs and the weight of the motor vehicle as a whole can be kept at a particularly low level.

The invention is based in particular on the following realization: the belt starter is used for example during a so-called engine start-stop-start phase. In the course of such an engine start-stop-start phase, the initially activated internal combustion engine, which is thus in powered (fired) operation, is automatically stopped or shut down, and thus transferred into its deactivated state, in particular by an electronic processing device of the motor vehicle and/or in a manner dependent on the fulfilment of at least one predefinable condition. Following this, in the course of the engine start-stop-start phase, the internal combustion engine is automatically started again, and thus transferred from the deactivated state into powered operation, by the electronic processing device and for example in a manner dependent on the fulfilment of at least one predefinable condition. In other words, in the course of the engine start-stop-start phase, the internal combustion engine is for example automatically deactivated and then activated again, specifically without any action on the part of the driver of the motor vehicle. In the course of the engine start-stop-start phase, the internal combustion engine is automatically started by way of the belt starter, wherein the internal combustion engine is started in a particularly comfortable manner owing to a low level of vibration or an absence of vibration.

The pinion starter is used for example in the event of a cold start of the internal combustion engine. A cold start of said type is to be understood in particular to mean that the starting of the internal combustion engine is effected by the driver of the motor vehicle, in particular by virtue of the driver actuating, in particular pressing, an operator control element designed for example as a button. The starting of the internal combustion engine in the event of the cold start is thus not performed automatically, for example, but rather as a result of the actuation of the operator control element by the driver. The starting of the internal combustion engine effected by use of the pinion starter, that is to say the cold start, is commonly less comfortable than the starting of the internal combustion engine performed by way of the belt starter in the course of the engine start-stop-start phase, because more intense vibrations commonly occur during the cold start than during the engine start-stop-start phase. In order to now for example realize similarly or equally comfortable starts both during the cold start and during the engine start-stop-start phase, provisions are commonly made in the case of the pinion starter which however lead to a cost- and weight-intensive pinion starter. Despite these cost- and weight-intensive measures, the starting of the internal combustion engine performed during the engine start-stop-start phase by way of the belt starter however remains more comfortable than the starting performed during the cold start by way of the pinion starter.

Since provision is however now made to use both the belt starter and the pinion starter to drive the driveshaft and to start the internal combustion engine during the starting process, in particular during the cold start, the internal combustion engine can be started in a particularly comfortable manner in particular also during a cold start, because excessive vibrations can be prevented. Furthermore, the pinion starter, also referred to as the cold starter, can be of compact design, that is to say of a design which is of small outer dimensions and expedient in terms of weight and costs, by virtue of the fact that it is for example assisted by the belt starter during the starting process. Since, according to the invention, both the pinion starter and the belt starter are used during the starting process, the starting process is also referred to as cooperative starting. To realize this cooperative starting, a simple and cost-optimized pinion starter can be used as the pinion starter, such that the costs and the weight for carrying out the method according to the invention can be particularly low. Furthermore, the belt starter can be kept inexpensive because, for example, no adaptation of the belt starter owing to a torque increase for the purposes of cold-start capability is provided and necessary. In other words, the belt starter, in particular during the belt operation thereof, does not need to be adapted to the cold start, because the belt starter is assisted by the pinion starter in particular during the cold start. As a result, the weight and thus the fuel consumption and the emissions of the internal combustion engine or of the motor vehicle as a whole can be kept particularly low.

The belt starter comprises for example a traction mechanism drive, also referred to as wraparound drive, which has for example a traction mechanism. The traction mechanism is designed for example as a belt or else as a chain. Furthermore, the belt starter comprises for example an electric machine, by which a first starter wheel of the belt drive can be driven. The first starter wheel is for example a toothed gear or else a belt pulley, wherein the traction mechanism at least partially loops around the first starter wheel. Furthermore, the belt drive comprises for example a second drive wheel, which may be designed as a toothed gear or else as a belt pulley. For example, the driveshaft can be driven by the second starter wheel. Here, provision may be made in particular whereby the second starter wheel is connected rotationally conjointly to the driveshaft. Altogether, the driveshaft can for example be driven by the electric machine, in particular in a motor mode of the electric machine, via the second starter wheel, the traction mechanism and the first starter wheel, in order to thereby for example start the internal combustion engine. The electric machine of the belt starter is also referred to as first electric machine.

The pinion starter has for example a second electric machine and a pinion which can be driven by the second electric machine, in particular in a motor mode of the second electric machine. The pinion is a first toothed gear which can interact with a second toothed gear and in particular in the form of a toothed ring. The second toothed gear is for example likewise a constituent part of the pinion starter. Here, the driveshaft can for example be driven by the second toothed gear, wherein provision may be made whereby the second toothed gear is connected rotationally conjointly to the driveshaft. Altogether, therefore, the driveshaft can be driven by the second electric machine via the second toothed gear and the pinion, because, in particular, the second toothed gear can be driven by the second electric machine via the first toothed gear. In particular, it is for example contemplated for the first toothed gear to be movable relative to the second toothed gear in an axial direction of the first and of the second toothed gear and to thus be movable from an initial position into an engaged position. In the initial position, the first toothed gear does not mesh with the second toothed gear, such that, in the initial position, the first toothed gear is not in engagement with the second toothed gear. However, in the engaged position, the first toothed gear meshes with the second toothed gear, such that the second toothed gear can then be driven by the second electric machine via the first toothed gear. A movement of the first toothed gear from the initial position into the engaged position is also referred to as engaging of the first toothed gear, such that the first toothed gear is for example initially engaged, whereupon the second toothed gear and thus the internal combustion engine can be driven or are driven by the second electric machine via the first toothed gear.

In an advantageous embodiment of the invention, the driveshaft is, during the starting process, driven at least temporarily simultaneously by way of the pinion starter and by way of the belt starter. In this way, it is for example possible to realize a particularly comfortable start, for example because, during the starting process, the driveshaft is driven or can be driven at least substantially continuously by the starting device.

A further embodiment is distinguished by the fact that the starting process has a first time interval and a second time interval. During the first time interval, the driveshaft is driven by the pinion starter, and drive of the driveshaft effected by the belt starter is not provided. This means that, during the first time interval, the driveshaft is not driven by the belt starter. During the second time interval, the driveshaft is driven by the belt starter, and drive of the driveshaft effected by the pinion starter is not provided. In other words, during the second time interval, the driveshaft is not driven by the pinion starter. In this way, the internal combustion engine can be started in a particularly comfortable manner, wherein both the pinion starter and the belt starter can be of a design which is expedient in terms of weight and costs.

Here, it has proven to be particularly advantageous if the second time interval follows the first time interval. In this way, it is for example firstly possible for a breakaway torque of the internal combustion engine or of the driveshaft to be overcome by way of the pinion starter. Here, it is for example the case that, by use of the pinion starter, the driveshaft, which is initially at a standstill, is accelerated and driven, in particular until the driveshaft has a predefinable non-zero rotational speed. Subsequently, it is for example the case that the belt starter takes over the execution of a cranking process, whereby the internal combustion engine can be started with a particularly low level of vibration or even without vibration and with particularly advantageous performance. For example, the first time interval transitions via a transition phase into the second time interval, wherein the transition phase is for example arranged between the first time interval and the second time interval. Altogether, it is thus for example contemplated for the driveshaft to initially be driven by means of the pinion starter, whilst drive of the driveshaft effected by means of the belt starter is not provided. The breakaway torque is overcome in this way. Then, in particular during the transition phase, it is for example the case that the driveshaft is driven both by the pinion starter and also simultaneously by the belt starter, such that a particularly advantageous and in particular jerk-free transition takes place from a first phase, during which the driveshaft is driven by the pinion starter but not by the belt starter, to a second phase, during which the driveshaft is driven by the belt starter but not by the pinion starter. The transition phase thus lies between the first phase and the second phase in terms of time, wherein the first phase is at least a part of the first time interval or is the first time interval, and the second phase is at least a part of the second time interval or is the second time interval. After the transition phase, it is for example the case that the pinion starter is deactivated, such that, then, after the transition phase, for example in or during the second phase, the driveshaft is driven by means of the belt starter but not by means of the pinion starter.

Particularly comfortable starting of the internal combustion engine can be realized in this way. Here, provision is made for example whereby the transition phase is shorter than the first phase and/or the second phase, such that the drive shaft is driven only very briefly by both starters. The first phase can also be kept very short, because it and the pinion starter are for example used only to overcome the breakaway torque. The second is for example longer than the first phase and/or longer than the transition phase, whereby particularly comfortable starting can be realized. The second phase is performed, in particular by means of the belt starter, for example until such time as combustion processes take place in the internal combustion engine, by which combustion processes the driveshaft is then driven. It is then for example possible for the second phase to be ended.

In order to be able to keep the weight, the costs and the structural space requirement of the pinion starter particularly low, provision is made, in a further embodiment of the invention, whereby the pinion starter is operated with an electrical voltage, in particular with a nominal electrical voltage, of 12 volts. The pinion starter is thus preferably designed as a 12-volt pinion starter or 12-volt cold starter.

A further embodiment is distinguished by the fact that the belt starter is operated with an electrical voltage, in particular with a nominal electrical voltage, of 12 volts. Thus, the belt starter is for example designed as a compact 12-volt belt starter which is expedient in terms of weight and costs. The respective electrical voltage is in particular a respective electrical voltage, in particular a respective nominal electrical voltage, of the respective electric machine of the respective starter.

It has however proven to be particularly advantageous if the belt starter is operated with an electrical voltage of more than 20 volts, in particular of more than 40 volts. The belt starter preferably has for example an electrical voltage, in particular a nominal electrical voltage, of 48 volts, such that a particularly high degree of functional fulfilment can be realized by the belt starter. In particular, it is contemplated here to realize recuperation operation and/or boost operation by way of the belt starter in order, for example by way of the boost operation, to assist the internal combustion engine in its powered operation and in driving the motor vehicle.

A second aspect of the invention relates to a drivetrain for a motor vehicle, in particular for a motor car such as for example a passenger automobile. The drivetrain has an internal combustion engine, by means of which the motor vehicle can be driven. Here, the internal combustion engine has a driveshaft via which the internal combustion engine can for example provide torques for driving the motor vehicle. Furthermore, the drivetrain comprises a starting device, by means of which a starting process can be performed in order to start the internal combustion engine and thereby transfer the internal combustion engine from a deactivated state into powered operation of the internal combustion engine.

In order to now be able to start the internal combustion engine in a particularly comfortable manner and expediently in terms of weight and costs, provision is made according to the invention whereby the starting device has a pinion starter and a belt starter, by means of which, in order to perform the starting process, the driveshaft can be driven during the starting process. Advantages and advantageous embodiments of the first aspect of the invention are to be regarded as advantages and advantageous embodiments of the second aspect of the invention, and vice versa.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a schematic illustration of a drivetrain for a motor vehicle, wherein the drivetrain is designed for carrying out a method for starting an internal combustion engine of the drivetrain.

DETAILED DESCRIPTION OF THE DRAWING

The single FIGURE shows, in a schematic illustration, a drivetrain 1 for a motor vehicle, in particular for a motor car such as for example a passenger automobile. The drivetrain 1 has an internal combustion engine 2 which is designed for example as a reciprocating-piston engine and which comprises a plurality of combustion chambers 3. A respective combustion chamber 3 is designed for example as a cylinder. The internal combustion engine 2 is also referred to as an engine or a combustion engine and furthermore has a driveshaft 4, which is for example in the form of a crankshaft. A respective piston is received, so as to be movable in translational fashion, in the respective combustion chamber 3. The respective piston is articulatedly coupled to the driveshaft, such that translational movements of the respective piston in the respective combustion chamber 3 are converted into a rotational movement of the driveshaft 4.

During powered (fired) operation of the internal combustion engine 2, combustion processes take place in the combustion chambers 3 and thus in the internal combustion engine 2, by means of which combustion processes the pistons and, via these, the driveshaft 4 are driven. In a deactivated state of the internal combustion engine 2, no combustion processes take place in the internal combustion engine or in the combustion chambers 3, such that the pistons and thus the driveshaft 4 are at a standstill.

The drivetrain 1 furthermore comprises at least one axle 5 with wheels 6, wherein the wheels 6 and thus the motor vehicle as a whole can be driven by the internal combustion engine 2. In particular during the powered operation thereof, the internal combustion engine 2 is operated for example in traction operation, in which the wheels 6 can be driven or are driven by the driveshaft 4, and thus by the internal combustion engine 2, in particular via a differential transmission 7, a shaft 8 and a clutch 9.

The drivetrain 1 furthermore comprises a starting device which is denoted as a whole by 10 and by means of which a starting process can be performed in order to start the internal combustion engine 2 by way of the starting process and thereby transfer the internal combustion engine from the deactivated state into powered operation. In other words, a method for starting the internal combustion engine 2 is performed by means of the starting device 10. In the method, the above-stated starting process is performed, by which the internal combustion engine 2 is started and thereby transferred from the deactivated state into powered operation.

In order to now be able to perform the starting process with a particularly low level of vibration and thus in a comfortable manner, and at the same time keep the structural space requirement, the weight and the costs of the starting device 10 particularly low, the starting device 10 comprises a pinion starter 11, which is also referred to as a cold starter, and a belt starter 12, which is also referred to as a traction mechanism starter and by which the driveshaft 4 can be driven during the starting process in order to perform the starting process. In other words, in the course of the method, provision is made whereby the starting process is performed by the pinion starter 11 and by the belt starter 12, by which the driveshaft 4 is driven during the starting process. The pinion starter 11 is a first starter or is also referred to as the first starter of the starting device 10, whereas the belt starter 12 is a second starter or is referred to as the second starter of the starting device 10.

The pinion starter 11 has a first electric machine 13 which is operable as an electric motor, a first toothed gear in the form of a pinion 14, and a second toothed gear in the form of a toothed ring 15, by means of which it is for example possible for the driveshaft 4 to be driven. Here, the toothed ring 15 is for example at least indirectly connected rotationally conjointly to the driveshaft 4. It can be seen from the FIGURE that the pinion 14 can be driven by the electric machine 13, wherein the toothed ring 15 can be driven by the pinion 14 and thus, via the pinion 14, by the electric machine 13. In this way, the driveshaft 4 can be driven by the electric machine 13 via the toothed ring 15 and the pinion 14. Thus, during the starting process, the driveshaft 4 is driven by the electric machine 13 via the toothed ring 15 and the pinion 14.

The belt starter 12 has a traction mechanism drive 20, which has a first drive wheel 16, a traction mechanism 17 designed for example as a belt, and a second drive wheel 18. Here, the driveshaft 4 can be driven for example by the second drive wheel 18 because, for example, the second drive wheel 18 is connected rotationally conjointly to the driveshaft 4. The drive wheel 18 and in particular the traction mechanism 17 can be driven by the drive wheel 16 because, for example, the traction mechanism 17 at least partially loops around each of the drive wheels 16 and 18. The drive wheel 16 can in turn be driven by a second electric machine 19 of the belt starter 12, which comprises the second electric machine 19. The second electric machine 19 can be operated as an electric motor, by means of which the drive wheel 16 can be driven or is driven. During the starting process, the driveshaft 4 is thus driven by the electric machine 19 via the drive wheel 18, the traction mechanism 17 and the drive wheel 16.

In particular, the starting process has a first time interval and a second time interval which at least partially follows the first time interval. During the first time interval, the driveshaft 4 is for example driven by means of the pinion starter 11, whilst drive of the driveshaft 4 effected by means of the belt starter 12 is not provided. During the second time interval, the driveshaft 4 is for example driven by the belt starter 12, whilst drive of the driveshaft 4 effected by means of the pinion starter 11 is not provided. The first time interval is for example a first phase, whereas the second time interval is a second phase. Between the first phase and the second phase there is for example situated a transition phase, via which the first time interval or the first phase transitions into the second time interval or the second phase respectively. During the transition phase, it is for example the case that the driveshaft 4 is driven by the pinion starter 11 and by the belt starter 12 simultaneously, such that, during the transition phase, it is for example the case that the pinion starter 11 and the belt starter 12 simultaneously drive the driveshaft 4.

It is for example the case that a breakaway torque of the driveshaft 4 is overcome by means of the first phase and thus by means of the pinion starter 11. After the first phase, it is for example the case that the belt starter 12 is activated in addition to the pinion starter 11, such that both the pinion starter 11 and the belt starter 12 are operated simultaneously during the transition phase. Following this, the belt starter 12 takes over a cranking process, in the course of which the driveshaft 4 is cranked by way of the belt starter 12 and thus brought to a predefinable rotational speed. For this purpose, it is for example the case that, after the transition phase, the pinion starter 11 is deactivated, such that, during the second phase, the driveshaft 4 is driven only by the belt starter 12, but not by the pinion starter 11. The second phase lasts in particular until such time as combustion processes take place in the combustion chambers 3, by which combustion processes the driveshaft 4 is driven. The second phase is then ended by virtue, for example, of the belt starter 12 being deactivated.

The starting process is also referred to as cooperative starting, because the starters assist or supplement one another. By virtue of the fact that only the breakaway torque is overcome by way of the pinion starter 11 and the actual cranking process is performed by way of the belt starter 12, the internal combustion engine 2 can be started with a particularly low level of vibration and thus in a particularly comfortable manner. The starting process is in particular a so-called cold start, which is performed not automatically, for example, by an electronic processing device of the drivetrain 1, but rather as a result of an actuation by the driver of the motor vehicle of an operator control element which is arranged for example in the interior compartment of the motor vehicle.

LIST OF REFERENCE DESIGNATIONS

1 Drivetrain
2 Internal combustion engine
3 Combustion chambers
4 Drive shaft
5 Axle
6 Wheel
7 Differential transmission
8 Shaft
9 Clutch
10 Starting device
11 Pinion starter
12 Belt starter
13 First electric machine
14 Pinion
15 Toothed ring 16 First drive gear
17 Traction mechanism
18 Second drive gear
19 Second electric machine
20 Traction mechanism drive The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for starting an internal combustion engine, having a driveshaft, for a motor vehicle, comprising:
    performing a starting process by which the internal combustion engine is started so as to transfer from a deactivated state into powered operation,
    wherein
        the starting process is performed by a pinion starter and by a belt starter, by which the driveshaft is driven during the starting process, and
        the driveshaft is, during the starting process, driven at least temporarily simultaneously by the pinion starter and by the belt starter.

2. The method according to claim 1, wherein the starting process comprises:
    a first time interval, during which the driveshaft is driven by the pinion starter and the belt starter does not drive the driveshaft; and
    a second time interval, during which the driveshaft is driven by the belt starter and the pinion starter does not drive the driveshaft.

3. The method according to claim 2, wherein
    the second time interval at least partially overlaps the first time interval.

4. The method according to claim 1, wherein
    the pinion starter is operated with an electrical voltage of twelve volts.

5. The method according to claim 4, wherein
    the belt starter is operated with an electrical voltage of twelve volts.

6. The method according to claim 4, wherein
    the belt starter is operated with an electrical voltage of more than 20 volts.

7. The method according to claim 4, wherein
    the belt starter is operated with an electrical voltage of more than 40 volts.

8. A drivetrain for a motor vehicle having an internal combustion engine with a driveshaft and by which the motor vehicle is driven, comprising:
    a starting device, by which a starting process is performed in order to start the internal combustion engine so as to transfer the internal combustion engine from a deactivated state into powered operation,
    wherein
        the starting device has a pinion starter and a belt starter by which, in order to perform the starting process, the driveshaft is drivable during said starting process, and
        the driveshaft is, during the starting process, driven at least temporarily simultaneously by the pinion starter and by the belt starter.

* * * * *